(12) United States Patent
Hu

(10) Patent No.: US 7,567,316 B2
(45) Date of Patent: Jul. 28, 2009

(54) BACKLIGHT MODULE

(75) Inventor: Cheng-Chung Hu, Taoyuan (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 302 days.

(21) Appl. No.: 11/642,935

(22) Filed: Dec. 21, 2006

(65) Prior Publication Data
US 2007/0222910 A1  Sep. 27, 2007

(30) Foreign Application Priority Data
Mar. 23, 2006 (TW) .............................. 95110153 A

(51) Int. Cl.
*G02F 1/1333* (2006.01)
(52) U.S. Cl. .......................................... 349/58; 349/56
(58) Field of Classification Search .................. 349/56, 349/58–60
See application file for complete search history.

(56) References Cited

U.S. PATENT DOCUMENTS 6,847,417 B2 * 1/2005 Kim ............................. 349/58

* cited by examiner

*Primary Examiner*—Kevin S Wood
(74) *Attorney, Agent, or Firm*—Muncy, Geissler, Olds & Lowe, PLLC

(57) ABSTRACT

A backlight module of a liquid crystal display is provided. The backlight module includes a back cover, an optical plate, at least one light source, a mold frame and at least one optical film. The optical plate is disposed on the back cover and the light source is disposed adjacent to the optical plate. The mold frame surrounding the back cover has a protruding structure. The protruding structure is located between a light outlet surface of the optical plate and a front frame of the mold frame to form a recess, so that the optical film can be disposed in the recess. The present invention also discloses a liquid crystal module including a backlight module and a liquid crystal panel. The liquid crystal panel is disposed on a mold frame of the backlight module.

15 Claims, 5 Drawing Sheets

BACKLIGHT MODULE

RELATED APPLICATIONS

The present application is based on, and claims priority from, Taiwan Application Ser. No. 95110153, filed Mar. 23, 2006, the disclosure of which is hereby incorporated by reference herein in its entirety.

BACKGROUND

1. Field of Invention

The present invention relates to a backlight module, and more particularly, to a mold frame of the backlight module.

2. Description of Related Art

Since liquid crystal display (LCD) devices are non-emissive type display devices, they require external light sources to display the images. Generally, a backlight module is disposed behind a LCD panel to provide light to the LCD panel. The backlight module is an important component that greatly influences the display quality of the LCD device.

FIG. 1A is a schematic, exploded view of a conventional backlight module. FIG. 1B is a schematic, top view of the conventional backlight module in FIG. 1A. FIG. 1C is a cross-sectional view from the A-A line in FIG. 1B. Referring to FIG. 1A, FIG. 1B and FIG. 1C, the backlight module 100 includes a back cover 105, a light guide plate 110, a light source 112, at least one optical film 115 and a mold frame 120. The mold frame 120 includes a front frame 124 and a lateral side 122 of the front frame 124.

A liquid crystal display module can be fabricated by assembling the backlight module with a liquid crystal cell (not shown). However, the conventional backlight module may become defective when the ambient temperature varies. This is because the mold frame 120 constrains the components of the backlight module 100 that have different thermal expansion coefficients. More specifically, the front frame 124 presses the edges of the optical film 115. A display problem of the liquid crystal display module thus arises when the ambient temperature varies, because the optical film 115 becomes warped and presses the polarizer of the liquid crystal display module.

Accordingly, providing a backlight module that can prevent the liquid crystal display module from being defective when the temperature varies is an issue of great consequence.

SUMMARY

It is an aspect of the present invention to provide a backlight module, which can prevent the optical film thereof from being warped when the ambient temperature varies.

It is another aspect of the present invention to provide a liquid crystal display module, which can prevent the optical film from being pressed by the backlight module when the ambient temperature varies.

Accordingly, the present invention provides a backlight module that includes a back cover, an optical plate, at least one light source, a mold frame and at least one optical film. The optical plate is disposed on the back cover. The light source is disposed adjacent to the optical plate. The mold frame is disposed surrounding the back cover. The mold frame has a front frame with a protruding structure and a lateral side. The protruding structure is disposed between a light outlet surface of the optical plate and the front frame to form a recess between the light outlet surface and the front frame. The optical film is disposed in the recess.

The present invention also provides a liquid crystal display module includes a backlight module and a liquid crystal panel. The backlight module includes a back cover, an optical plate, at least one light source, a mold frame and at least one optical film. The optical plate is disposed on the back cover. The light source is disposed adjacent to the optical plate. The mold frame is disposed surrounding the back cover. The mold frame has a front frame with a protruding structure and a lateral side. The protruding structure is disposed between a light outlet surface of the optical plate and the front frame to form a recess between the light outlet surface and the front frame. The optical film is disposed in the recess. The liquid crystal panel is disposed on the front frame.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Figure 1A:
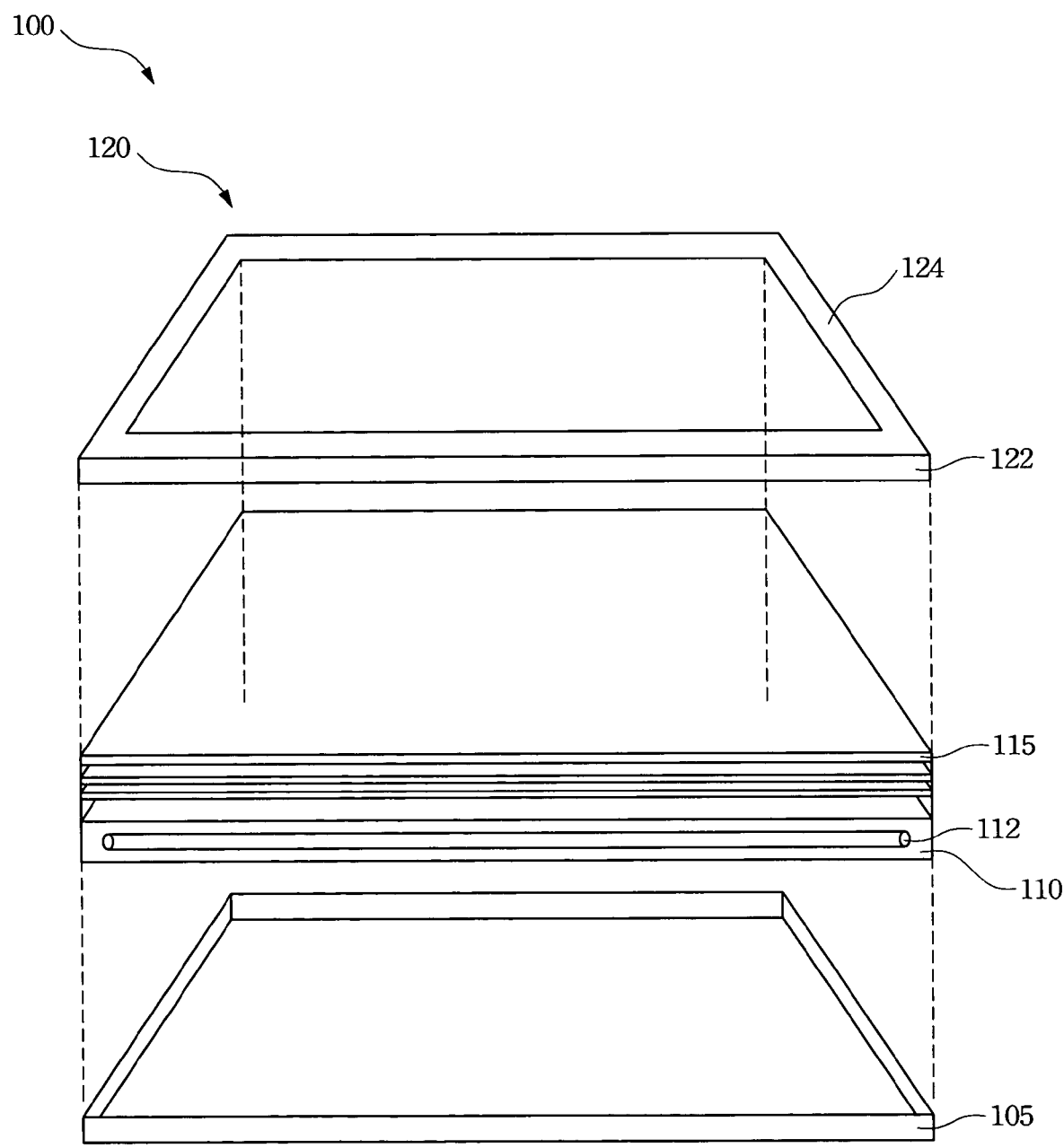
FIG. 1A is a schematic, exploded view of a conventional backlight module.
Figure 1B:
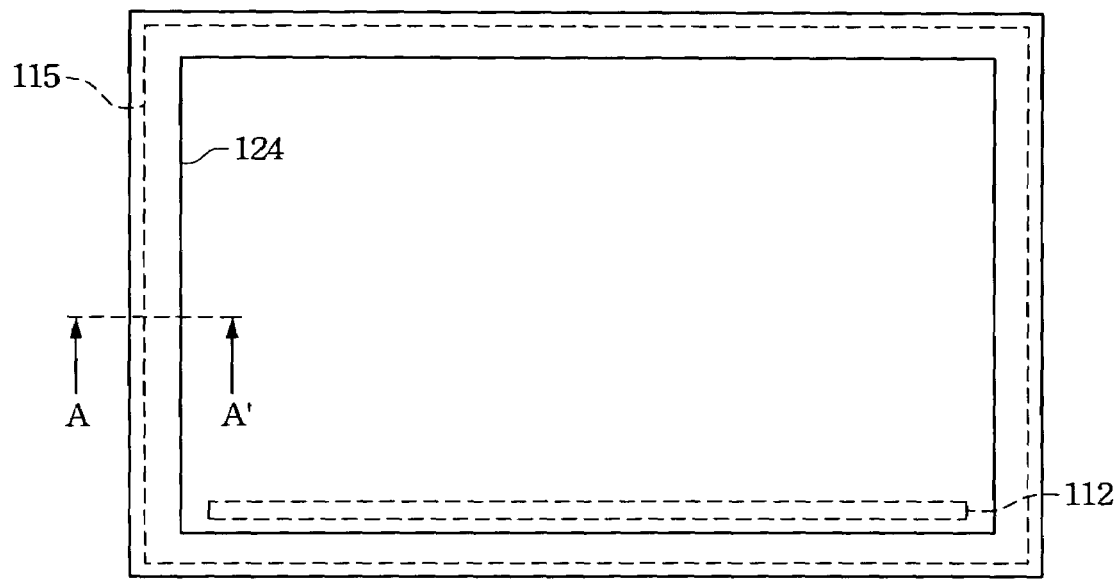
FIG. 1B is schematic, top view of the conventional backlight module in FIG. 1A.
Figure 1C:
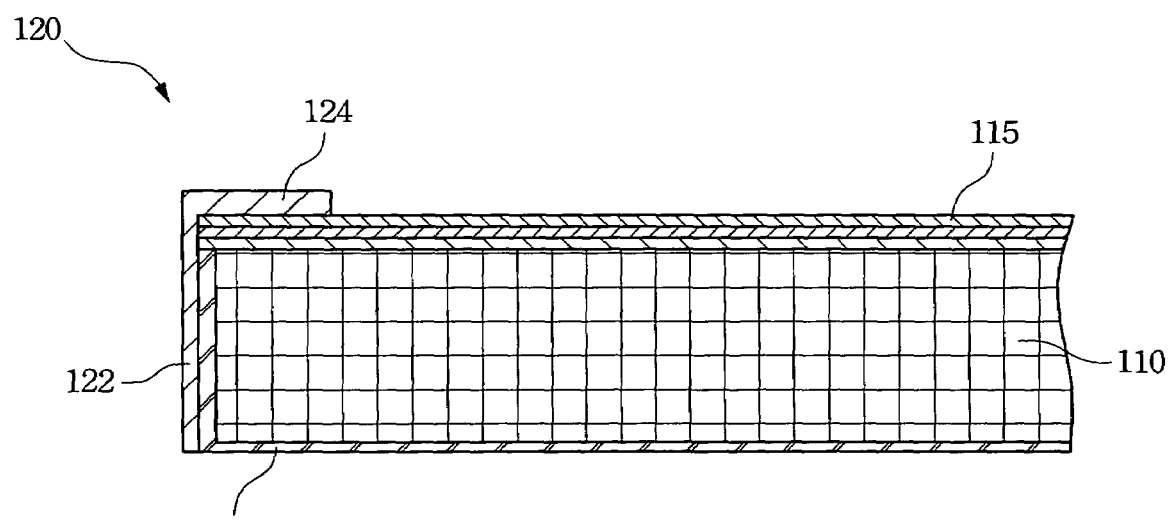
FIG. 1C is a cross-sectional view from the A-A' line in FIG. 1B.
Figure 2A:
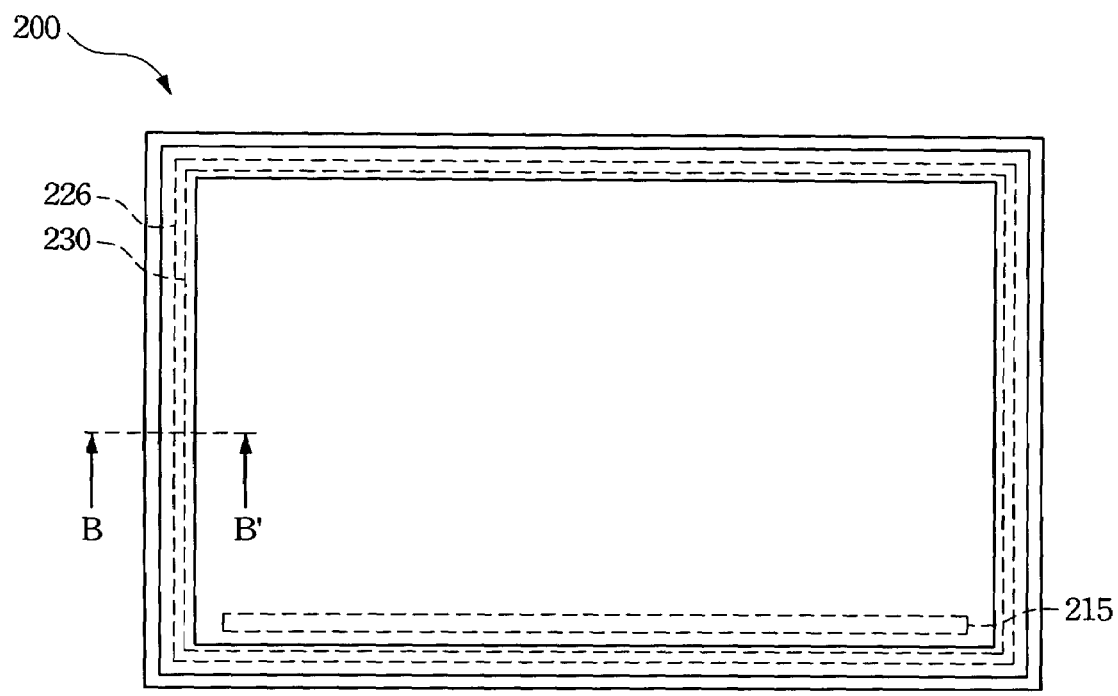
FIG. 2A is a top view of one preferred embodiment of the present invention.
Figure 2B:
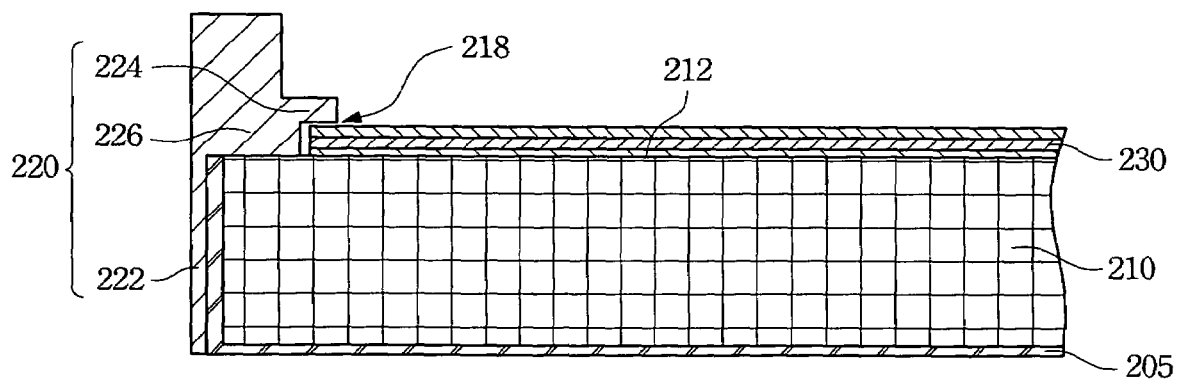
FIG. 2B illustrates a cross-sectional view from the B-B' line in FIG. 2A.

FIG. 2A is a top view of one preferred embodiment of the present invention. FIG. 2B illustrates the cross-sectional view of the B-B' line in FIG. 2A. In FIG. 2A and FIG. 2B, a backlight module 200 includes a back cover 205, an optical plate 210, at least one light source 215, a mold frame 220 and at least one optical film 230. The optical plate 210 disposed on the back cover 205 may be a light guide plate or a diffuser plate. The back cover 205 may be made of metal, such as aluminum. The optical plate 210 may be made of Polymethyl methacrylate (PMMA). The optical plate 210 is used to uniformly guide the light emitted from the light source 215 to a light outlet surface 212 in order to improve the quality of the backlight module 200. The light source 215 may be a cold cathode fluorescent lamp (CCFL), a light emitting diode (LED) or an electroluminescent lamp (EL). The light source 215 is disposed adjacent to the optical plate 210. The light source 215 can be located at one lateral side or two opposite lateral sides of the optical plate 210. The light source 215 also can be located between the back cover 205 and the optical plate 210.

With continued reference to FIG. 2A and FIG. 2B, the optical film 230 for improving brightness and uniformity of the backlight module 200 may be a lower diffuser, a brightness enhancement film, a prism sheet or an upper diffuser. The mold frame 220 surrounding the back cover 205 may be made of plastic. The mold frame 220 includes a front frame 224 with a protruding structure 226 and a lateral side 222. The front frame 224 is located around edges of the light outlet surface 212.

It is worth noting that the protruding structure 226 can be a rectangular frame protruding from the front frame 224 to the optical plate 210. More specifically, the protruding structure 226 is located between the front frame 224 and the optical plate 210, so as to form a recess 218 between the front frame 224 and a light outlet surface 212 of the optical plate 210. The optical film 230 can be disposed in the recess 218. Thus, the warping of the optical film 230 can be prevented, because the front frame 224 would not press the optical film 230 and the recess 218 accommodates the deformation of the optical film 230 when the ambient temperature varies.

The following discussion is intended to provide a brief general description of an assembly process of the backlight module 200 in FIG. 2A. At the start the optical plate 210 with at least one light source 215 is disposed on the back cover 205. Next, at least one optical film 230 is disposed on the optical plate 210. For example, a lower diffuser, a brightness enhancement film, a prism sheet and an upper diffuser are disposed on the optical plate 210 sequentially. Next, the mold frame 220 fastens the back cover 205, the optical plate 210, the light source 215 and the optical film 230. Since the mold frame 220 has the protruding structure 226, the front frame 224 would not press the optical film 230. Thus, the warping of the optical film 230 when the ambient temperature varies can be prevented.

Figure 3A:
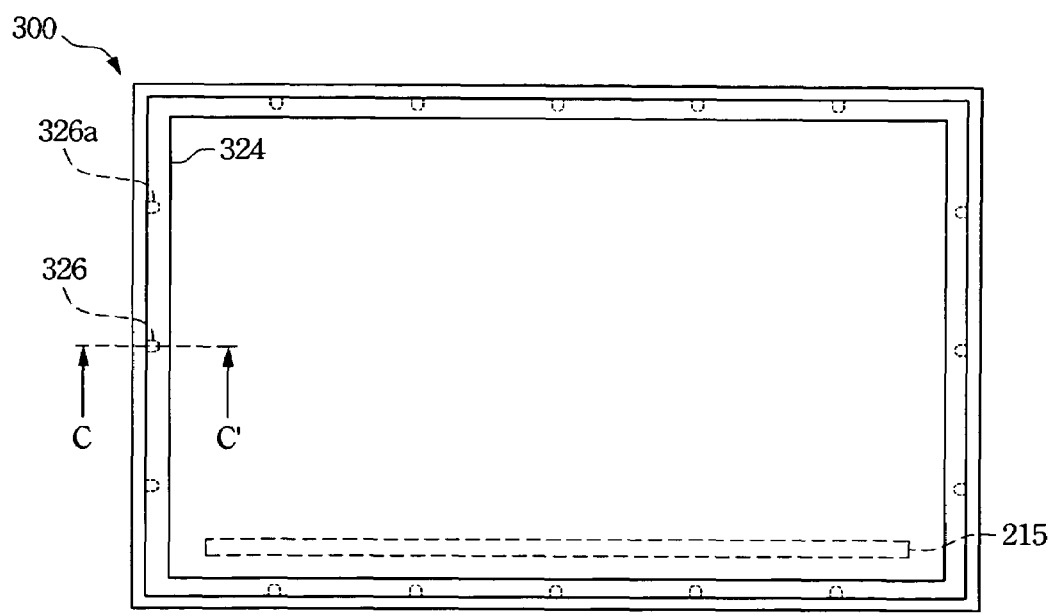
FIG. 3A is a top view of another preferred embodiment of the present invention.
Figure 3B:
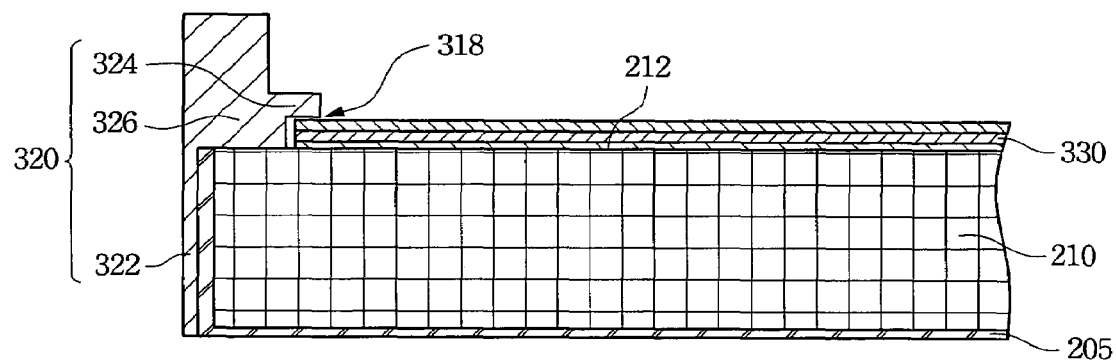
FIG. 3B illustrates a cross-sectional view from the C-C' line in FIG. 3A.

FIG. 3A is a top view of another preferred embodiment of the present invention. FIG. 3B illustrates a cross-sectional view from the C-C' line in FIG. 3A. With reference to FIG. 3A and FIG. 3B, the backlight module 300 includes a back cover 205, an optical plate 210, at least one light source 215, a mold frame 320 and at least one optical film 330. The mold frame 320 surrounds the back cover 205 and includes a front frame 324 with a protruding structure 326 and a lateral side 322. Compared to the preferred embodiment shown in FIG. 2A and FIG. 2B, it is worth noting that the protruding structure 326 is comprised of a plurality of protrusions 326a protruding from the front frame 324. The protrusions 326a are located between the front frame 324 and the optical plate 210, so as to form a recess 318 between the front frame 324 and a light outlet surface 212 of the optical plate 210.

Figure 3C:
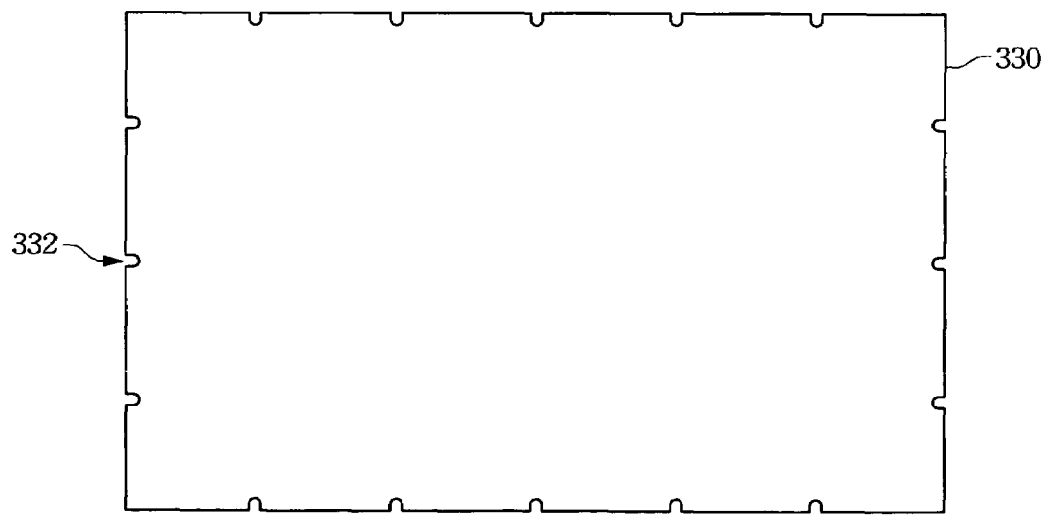
FIG. 3C is a top view of the optical film in FIG. 3B.

FIG. 3C is a top view of the optical film in FIG. 3B. With reference to FIG. 3B and FIG. 3C, the optical film 330 is disposed in the recess 318. It is worth noting that the optical film 330 has a plurality of holes 332 disposed corresponding to the protrusions 326a. The protrusion 326a protrudes through the hole 332 and is in contact with the light outlet surface 212. Thus, the warping of the optical film 330 can be prevented, because the front frame 324 would not press the optical film 330 and the recess 318 accommodates the deformation of the optical film 330 when the ambient temperature varies.

Figure 4A:
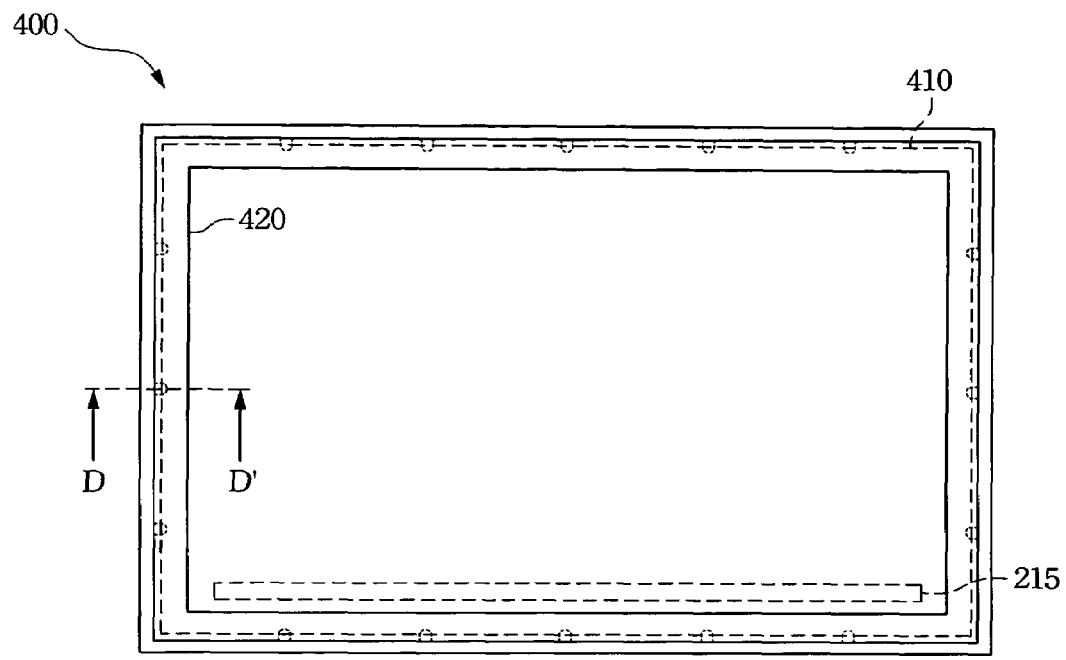
FIG. 4A is a top view of another preferred embodiment of the present invention.
Figure 4B:
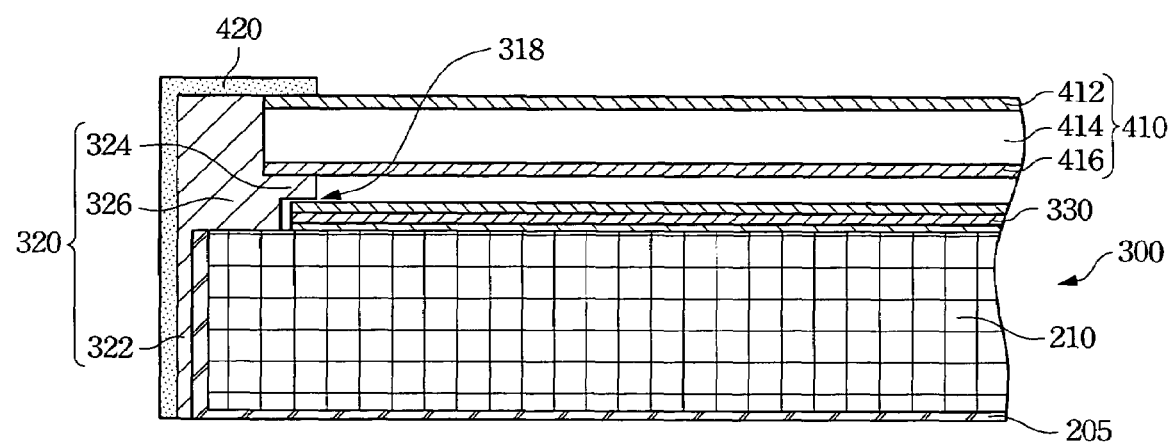
FIG. 4B illustrates a cross-sectional view from the D-D' line in FIG. 4A.

FIG. 4A is a top view of another preferred embodiment of the present invention. FIG. 4B is a cross-sectional view of the D-D' line in FIG. 4A. The liquid crystal display module 400 includes a liquid crystal panel 410, a backlight module 300 and a bezel 420. The bezel 420 may be made of metal. The liquid crystal panel 410 includes a first polarizing film 412, a liquid crystal cell 414 and a second polarizing film 416. The backlight module 300 includes a back cover 205, an optical plate 210, at least one light source 215, a mold frame 320 and at least one optical film 330. The mold frame 320 includes a front frame 324 with a protruding structure 326 and a lateral side 322. The liquid crystal panel 410 can be disposed on the front frame 324 and then fastened by using the bezel 420 to form the liquid crystal display module.

The protruding structure 326 forms a recess 318 between the front frame 324 and a light outlet surface 212 of the optical plate 210. The optical film 330 can be disposed in the recess 318. Thus, the warping of the optical film 330 can be prevented because the front frame 324 would not press the optical film 330 and the recess 318 accommodates the deformation of the optical film 330 when the ambient temperature varies.

According to preferred embodiments mentioned above, the backlight module of the present invention has a protruding structure that can prevent the optical film of the backlight module from becoming warped when the ambient temperature varies. Thus, the display quality of the liquid crystal display module can be improved by utilizing the backlight module.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module comprising:
    a back cover;
    an optical plate disposed on the back cover;
    at least one light source disposed adjacent to the optical plate;
    a mold frame disposed surrounding the back cover, the mold frame having a front frame with a protruding structure and a lateral side, wherein the protruding structure is disposed between a light outlet surface of the optical plate and the front frame to form a recess between the light outlet surface and the front frame; and
    at least one optical film disposed in the recess;
    wherein the protruding structure is comprised of a plurality of protrusions protruding from the front frame and the optical film has a plurality of holes corresponding to the protrusions, the protrusions protruding through the holes to be in contact with the light outlet surface.

2. A backlight module as recited in claim 1, wherein the protruding structure is a rectangular frame protruding from the front frame.

3. A backlight module as recited in claim 1, wherein the back cover is made of metal.

4. A backlight module as recited in claim 1, wherein the mold frame is made of plastic.

5. A backlight module as recited in claim 1, wherein the optical plate is a light guide plate or a diffuser plate.

6. A backlight module as recited in claim 1, wherein the light source is a cold cathode fluorescent lamp, a light emitting diode or an electroluminescent lamp.

7. A backlight module as recited in claim 1, wherein the optical film is a diffuser, a brightness enhancement film or a prism sheet.

8. A liquid crystal display module comprising:
a backlight module comprising:
a back cover;
an optical plate disposed on the back cover;
at least one light source disposed adjacent to the optical plate;
a mold frame disposed surrounding the back cover, the mold frame having a front frame with a protruding structure and a lateral side, wherein the protruding structure is disposed between a light outlet surface of the optical plate and the front frame to form a recess between the light outlet surface and the front frame; and
at least one optical film disposed in the recess; and
a liquid crystal panel disposed on the front frame;
wherein the protruding structure is comprised of a plurality of protrusions protruding from the front frame, and the optical film has a plurality of holes corresponding to the protrusions, the protrusions protruding through the holes to be in contact with the light outlet surface.

9. A liquid crystal display module as recited in claim 8, wherein the protruding structure is a rectangular frame protruding from the front frame.

10. A liquid crystal display module as recited in claim 8, wherein the liquid crystal panel includes a first polarizing film, a liquid crystal cell and a second polarizing film.

11. A liquid crystal display module as recited in claim 8, wherein the optical plate is a light guide plate or a diffuser plate.

12. A liquid crystal display module as recited in claim 8, wherein the light source is a cold cathode fluorescent lamp, a light emitting diode or an electroluminescent lamp.

13. A liquid crystal display module as recited in claim 8, wherein the optical film is a diffuser, a brightness enhancement film or a prism sheet.

14. A liquid crystal display module as recited in claim 8, further comprising a bezel disposed surrounding the mold frame to fasten the liquid crystal panel and the backlight module.

15. A liquid crystal display module as recited in claim 14, wherein the bezel is made of metal.

* * * * *